US012722401B2

(12) United States Patent
Noh

(10) Patent No.: US 12,722,401 B2
(45) Date of Patent: Sep. 1, 2026

(54) THERMAL PRINT HEAD WITH COF STRUCTURE

(71) Applicant: PRINICS CO., LTD., Suwon-Si (KR)

(72) Inventor: Kwang-Ho Noh, Suwon-Si (KR)

(73) Assignee: PRINICS CO., LTD., Suwon-si (KR)

( * ) Notice: Subject to any disclaimer, the term of this patent is extended or adjusted under 35 U.S.C. 154(b) by 84 days.

(21) Appl. No.: 18/645,160

(22) Filed: Apr. 24, 2024

(65) Prior Publication Data

US 2025/0332845 A1 Oct. 30, 2025

(51) Int. Cl.

| | |
|---|---|
| ***B41J 2/335*** | (2006.01) |
| ***B41J 2/35*** | (2006.01) |
| ***B41J 2/375*** | (2006.01) |

(52) U.S. Cl.

CPC ......... *B41J 2/3352* (2013.01); *B41J 2/33505* (2013.01); *B41J 2/33515* (2013.01); *B41J 2/33535* (2013.01); *B41J 2/3354* (2013.01); *B41J 2/3355* (2013.01); *B41J 2/3358* (2013.01); *B41J 2/35* (2013.01); *B41J 2/375* (2013.01)

(58) Field of Classification Search

CPC .. B41J 2/3352; B41J 2/33505; B41J 2/33515; B41J 2/33535; B41J 2/3354; B41J 2/3355; B41J 2/3358; B41J 2/35; B41J 2/375

See application file for complete search history.

(56) References Cited

U.S. PATENT DOCUMENTS

2007/0229642 A1* 10/2007 Koyama ................. B41J 2/325 347/165

FOREIGN PATENT DOCUMENTS

| | | | | |
|---|---|---|---|---|
| CN | 112721460 A | 4/2021 | | |
| JP | 2014189016 A | * 10/2014 | ............. | B41J 2/335 |
| KR | 10-1114760 A | 2/2012 | | |

* cited by examiner

*Primary Examiner* — Yaovi M Ameh

(74) *Attorney, Agent, or Firm* — Goldilocks ZONE IP LAW

(57) ABSTRACT

The thermal print head having COF structure is disclosed. According to the present invention, productivity can be improved with a low step of a protective resin by using a COF method, the height of the thermally compressed COF can be minimized in comparison with the surface of the ceramic substrate by electrically connecting the ceramic substrate and the COF through thermal compression using ACF, and the height of the thermally compressed COF can be minimized in comparison with the surface of the ceramic substrate.

8 Claims, 7 Drawing Sheets

THERMAL PRINT HEAD WITH COF STRUCTURE

TECHNICAL FIELD

The present invention relates to a thermal print head (TPH) having a chip on film (COF) structure. More specifically, the present invention relates to the TPH having a COF structure in which productivity is improved with a low step of a protective resin by using a COF method.

BACKGROUND OF THE INVENTION

In general, a TPH is a device that implements an image by using a direct thermal method and a thermal transfer method printing, and is classified into a thick film type TPH and a thin film type TPH according to a heating element.

A thin film type TPH is provided to improve thermal energy transfer efficiency to a printing paper and to obtain high density and high-quality printing, and to successively form a thin film of a conductive layer and a heating resistive layer on the front surface of a ceramic substrate coated with glass. The thin films of the heating resistance layer and the conductive layer are etched to the surface of the substrate according to a pattern that separates the heating elements to form a heating resistor array and a conductive layer pattern. Only a portion to be heated is selected from the heating resistive layer, and only the conductive layer of the upper part is etched and exposed to manufacture the heating element.

To prevent the manufactured heating element and conductive layer pattern from being damaged by contact with the printing ribbon or paper, a wear-resistant film is formed in necessary areas to produce the heating element.

A ceramic substrate on which a heating element is formed and a printed circuit board for supplying electrical signals and power to the heating element are respectively bonded to an upper surface of a heat sink for dissipating heat, a drive integrated circuit for driving the heating resistor is mounted on the upper surface of the printed circuit board or the upper surface of the ceramic substrate, by electrically connecting the heating element, the printed circuit board, and the driving integrated circuit, the TPH can be completed as a whole.

For TPH, the drive integrated circuit is selectively switched by a signal input from a printed circuit board to heat selected heating resistors among the heating resistors, and the heat generated from the heating resistor is heated to a thermal paper so that printing can be accomplished.

FIG. 1 illustrates a conventional TPH according to related art.

As shown in FIG. 1, the TPH 10 is a wire boding method, and incudes: a ceramic substrate 11 having heating elements 11*a* made of heating resistors and a wear-resistant film with a locally exposed conductive layer thereon and a conductive layer having wiring (not shown) for supplying a signal; a printed circuit board 12 connected to a side surface of the ceramic substrate 11 to supply electric signals and power to the heating elements 11*a*; a TPH driving IC 13 which is installed on the upper part of the printed circuit board 12 and supplies a signal for heating any selected heating resistors; a wire 14 connected to a wire bonding pad (not shown) to provide an electric signal to the TPH driving IC 13, and a protective resin 15 protecting the TPH driving IC 13, the wire 14, and the wire bonding pad (not shown) by using silicon or epoxy; and a heat sink 16 attached to the lower part of the ceramic substrate 11 and the printed circuit board 12 to release heat, thereby reducing the size of the ceramic substrate 11.

However, the TPH 10 of the wire bonding method according to the related art of FIG. 1 has the problem of low productivity due to quality problems during wire bonding, and the problem of a large area of protective resin and a gap between the ceramic substrate 11 and the printed circuit board 12.

In addition, the printing paper 18 moving between the platen roller 17 and the heating element(s) 11*a* is jammed by the protective resin 15 protruding upward.

In addition, FIG. 2 is another example diagram showing a TPH device according to a related art. Referring to FIG. 2, the TPH device 20 is a flip chip bonding method, and includes:

- a ceramic substrate 11*a* forming heating elements and a conductive layer wiring for signal supply (not shown) thereon; a printed circuit board 12 connected to the side of the ceramic substrate 11 to supply electric signals and power to the heating elements; a TPH driving IC 13 formed on an upper portion of the ceramic substrate 11 for supplying a signal to randomly selected heating elements to generate heat; a protective resin 15 that protects the driving IC 13; and a heat sink 16 attached to the bottom the ceramic substrate 11 and the printed circuit board 12 to dissipate heat, thereby providing better quality compared to the method using wire bonding.

However, the flip chip bonding method has a problem in that the size of the ceramic substrate 21 must be relatively large because it is located on the ceramic substrate 21 for bonding a fine pattern.

In addition, the flip chip bonding method consists of a protective resin 15 that protects the drive IC 13 on the ceramic substrate 11, so there is a problem that the step of the ceramic substrate 11 and the protective resin 15 occurs as much as the thickness of the TPH driving IC 13.

In addition, the printing paper 17 moving between the platen roller 18 and the heating elements 11*a* is jammed by the protective resin 15 protruding upward.

RELATED ART

Patent Document

Korean Patent No. 10-1114760, titled "HEAD SUBSTRATE, METHOD FOR MOUNTING DRIVER IC ON HEAD SUBSTRATE, AND THERMAL HEAD SUBSTRATE." Issued on Feb. 2, 2012.

EMBODIMENT OF THE INVENTION

Problems to be Solved

In order to solve this problem, the present invention is to provide a thermal print head (TPH) having a COF structure, which improves productivity with a low step of a protective resin by using a COF method.

Means for Solving Problems

To achieve the above object mentioned above, an embodiment of the present invention is a TPH having a COF structure. The TPH may include a TPH driving integrated circuit (IC) is installed on one side thereof, a COF module including a film having a conductive pattern electrically connected to the TPH driving IC, a ceramic substrate electrically connected to one side of the COF module, a printed circuit board electrically connected to the other side of the COF module, and a heat sink attached to a lower side of the ceramic substrate 120 and the printed circuit board 130 to emit, i.e., dissipate heat.

In addition, the ceramic substrate and the printed circuit board according to the embodiment are installed to be spaced apart from each other by a predetermined distance around the COF module. For example, the COF module is accommodated between the ceramic substrate and the printed circuit board.

In addition, the printed circuit board according to the embodiment of the present invention may include at least any one or more of a temperature sensor for sensing the temperature of a heat sink, a capacitor charged with constant power and supplying constant current when driving the TPH driving IC, and an ETCC for controlling an operation of the TPH.

Additionally, the heat sink according to an embodiment of the present invention is provided with a groove portion that accommodates at least any one of a temperature sensor, a capacitor, and an ETCC installed on the printed circuit board.

Additionally, the heat sink may include a step portion formed to accommodate the ceramic substrate so that the ceramic substrate is disposed flat with the COF module and the printed circuit board.

In addition, the TPH may further include a flexible printer circuit (FPC) that electrically connects the main PCB assembly that controls the operation of the TPH to one end of the printed circuit board according to aspects of the embodiment of the present invention.

In addition, an embodiment of the present invention is a TPH having a COF structure. The TPH may include a COF module including a TPH driving IC and a film having a conductive pattern formed to electrically connect the TPH driving IC to one side thereof, a ceramic substrate electrically connected to one side of the COF module, and a heat sink attached to the bottom surface of the rectangular film and the ceramic substrate to release heat. In other words, the COF may include the TPH driving IC and the film, which is, for example, rectangular shape.

In addition, an upper surface of the TPH driving IC is arranged in a heat sink direction according to the embodiment. In other words, an upper surface of the TPH driving IC faces the heat sink.

In addition, the electrode formed on the bottom surface of the TPH driving IC and the film forming the conductive pattern are electrically connected and sealed using an insulating material according to the embodiment of the present invention.

In addition, an insulating material is made of silicon or epoxy according to an embodiment of the present invention.

In addition, the COF module may further include a temperature sensor for sensing a temperature of the heatsink according to an embodiment of the present invention.

Additionally, the COF module may be charged with a predetermined power and further include one or more capacitors that supply a predetermined current when driving the TPH driving IC according to an embodiment of the present invention.

In addition, the COF module according to the above embodiment may further include Energized Time Correction Control (TCC) for controlling the operation of the TPH.

Additionally, the heat sink according to the above embodiment may include a groove portion that accommodates at least any one or more of the temperature sensor, the capacitor, and the ETCC.

In addition, the COF module according to an embodiment of the present may further include Energized Time Correction Control (TCC) for controlling the operation of the TPH.

Moreover, the heat sink according to the embodiment of the present invention may include a temperature sensor, a capacitor, and a groove portion accommodating the ETCC.

Moreover, the heat sink according to the embodiment of the present invention may include a step portion, which accepts the ceramic substrate so that the ceramic substrate be flat arranged with the COF module forms.

In addition, the COF module according to the embodiment is electrically connected to a main PCB assembly for controlling the operation of the TPH at the end of the film.

Effects of the Invention

The present invention has the advantage of improving productivity with a low step of the protective resin by using the COF method.

In addition, the present invention has the advantage of minimizing the height of the thermo-compressed COF compared to a surface of the ceramic substrate by electrically connecting the ceramic substrate and the COF through thermocompression using ACF.

In addition, aspects of the present invention may have an advantage of allowing printing paper to pass without being jammed as it passes by minimizing the height of the heat-compressed COF compared to the surface of the ceramic substrate.

In addition, the present invention has the advantage that by configuring the driving IC in the COF to be located on the bottom surface, a portion protruding upward from the ceramic substrate can be minimized, thereby minimizing factors that affect the printing paper during the printing process.

DETAILED DESCRIPTION

Figure 1:
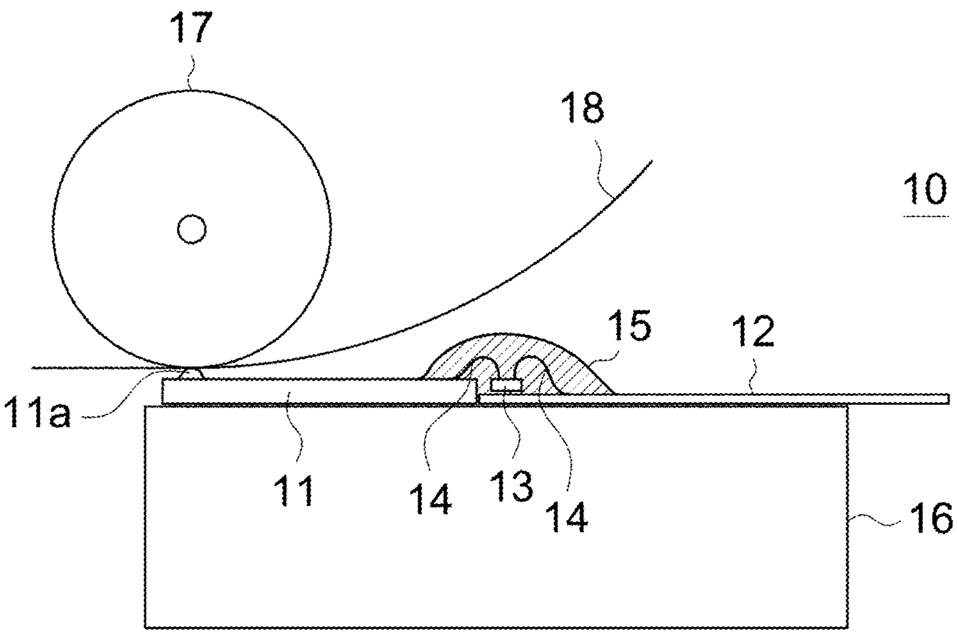
FIG. 1 is an exemplary diagram showing TPH according to a related art.
Figure 2:
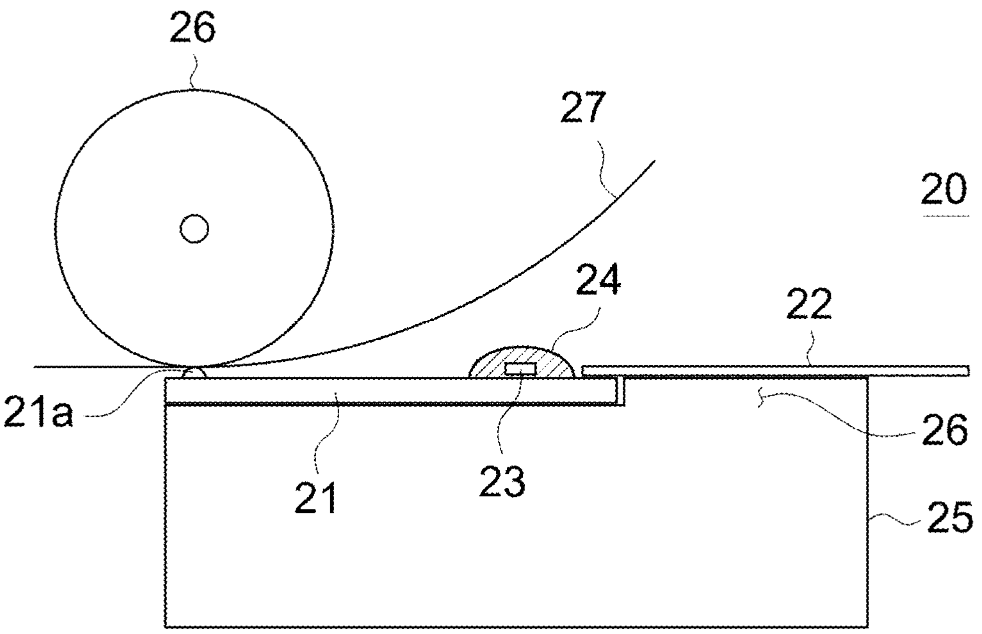
FIG. 2 is another exemplary diagram showing TPH according to a related art.
Figure 3:
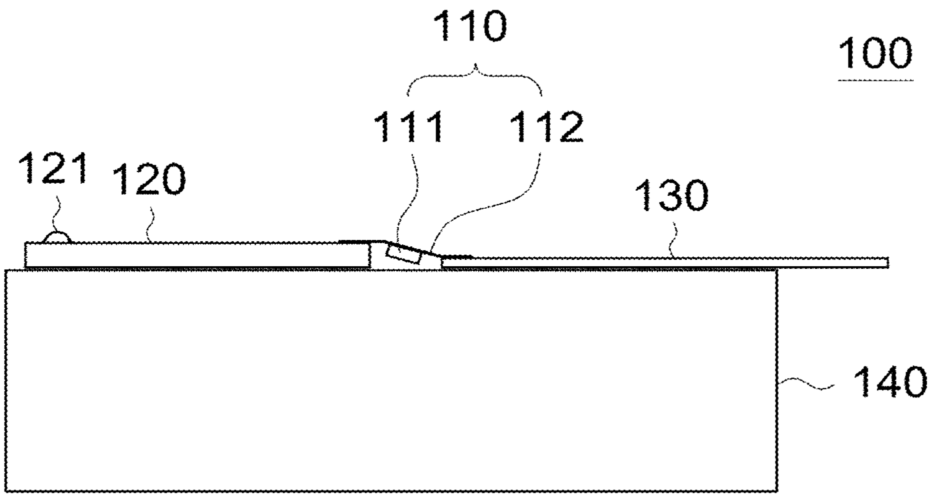
FIG. 3 is an exemplary diagram illustrating a thermal printhead having a COF structure according to a first embodiment of the present invention.
Figure 4:
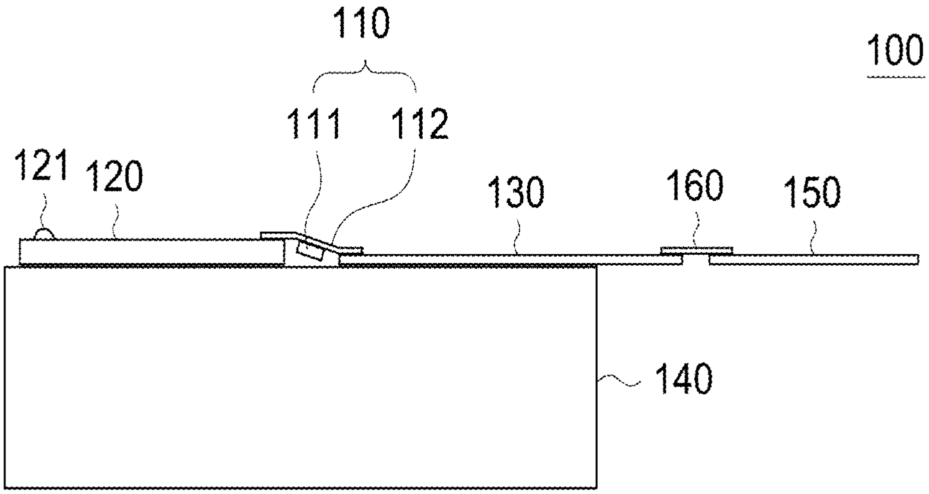
FIG. 4 is an exemplary diagram illustrating a state in which a thermal print head having a COF structure and a main PCB assembly are connected according to an embodiment of FIG. 3.

Hereinafter, embodiments and an example of the invention disclosed in this specification will be described with reference MA the accompanying drawings. Note that the invention disclosed in this specification is not limited to the following description, and it is easily understood by those skilled in the art that modes and details can be variously changed. Therefore, the invention disclosed in this specification is not construed as being limited to the following description of the embodiments and the example. Note that the ordinal numbers such as "first" and "second" in this specification are used for convenience and do not denote the order of steps and the stacking order of layers. In addition, the ordinal numbers in this specification do not denote particular names which specify the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. In the drawings, the thicknesses, widths, and intervals of layers and regions are exaggerated for clarity.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, "connected" includes physically and/or electrically connected. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

The invention will be described in detail hereinafter with reference to preferred embodiments of the invention and the accompanying drawings, wherein like reference numerals in the drawings refer to like components.

Before describing specific details for practicing the present invention, it should be noted that configurations not directly related to the technical essence of the invention have been omitted without departing from the technical essence of the invention.

Furthermore, terms or words used in this specification and claims are to be construed with a meaning and concept consistent with the technical idea of the invention, based on the principle that the inventor may define the concepts of appropriate terms to best describe his invention.

Hereinafter, a preferred embodiment of a thermal print head (TPH) having a COF structure according to an embodiment of the present invention will be described in detail with reference to the attached drawings.

First Embodiment

Referring to FIGS. 3, 4, and 11A-11B, a TPH 100 having a COF structure according to a first embodiment of the present invention may include a COF module 110, a ceramic substrate 120, a printed circuit board (PCB) 130, and a heat sink 140 to improve productivity with a low step portion of a protective resin.

Figure 11A:
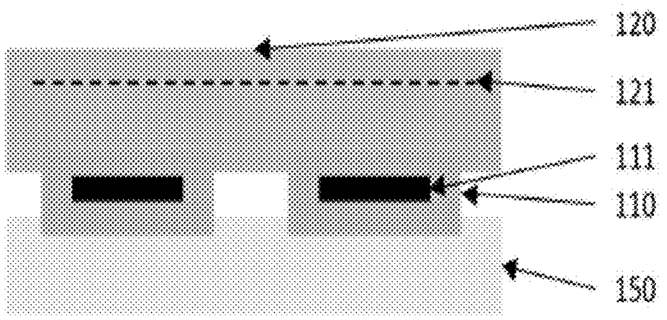
FIG. 11A-11B illustrates a thermal printhead having a COF structure according to a fifth embodiment of the present invention.
Figure 11B:
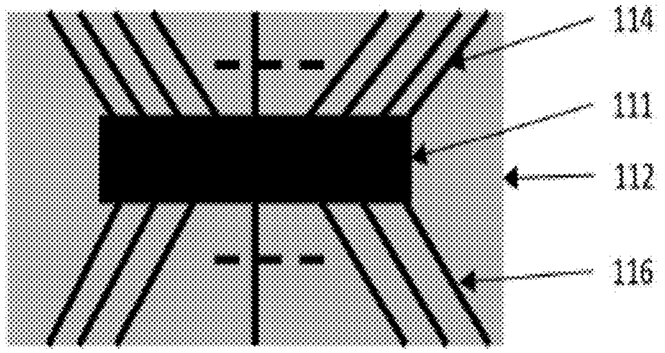

Referring to FIG. 11A-11B, for example, FIG. 11A illustrates a floor plan of a TPH with a chip on film (COF). FIG. 11B illustrates a enlarged view of COF. The COF module 110 may be configured to include a TPH driving IC 111 for driving a TPH, and a film 112 having a conductor pattern formed thereon including a wiring for connecting to a ceramic substrate 114, a circuit for connecting to a PCB 116, and a device hole (not shown) electrically connected to the TPH driving IC 111 on the insulating film.

In addition, a conductor pattern 116 printed on the insulating film may be formed by performing a plating treatment using tin and/or gold. However, it is not limited thereto.

In addition, the insulating film of the COF 112 having the conductive pattern formed thereon may be formed of a polyimide film having flexibility together with insulating properties.

In addition, the COF module 110 is electrically connected to an electrode formed on the bottom surface of the TPH driving IC 111 and the COF 112 having a conductive pattern, and may be sealed using a protective resin to protect the TPH driving IC 111.

Here, the protective resin for protecting the TPH driving IC 111 may be made of an insulating material and may be formed using silicon or epoxy.

The ceramic substrate 120 may be formed with a heating resistor array, which include a plurality of resistors 121, a COF bonding pad (not shown), conductive layer wiring(s) 116, and a wear-resistant film (not shown). In addition, the ceramic substrate 120 allows the COF bonding pad (drawing required) and the COF module 110 to be electrically connected through thermocompression bonding using an anisotropic conductive film (ACF).

Through the thermocompression bonding using ACF, the height of the thermos-compressed COF module 110 is minimized compared to the surface of the ceramic substrate 120 so that the printed paper can pass through without being caught when passing through.

In addition, the ceramic substrate 120 and the COF module 110 may be connected not only through ACF bonding but also through soldering.

The printed circuit board 130 supplies electric signals and power to the COF module 110 and the ceramic substrate 120. One side of the printed circuit board 130 is electrically connected to the COF module 110 through thermocompression bonding using ACF.

In addition, the other side of the printed circuit board 130 is installed to be extended by a predetermined length from the heat sink 140, and a connection terminal (not shown) for connecting to the TPH may be provided at an end thereof.

To this end, the COF module 110 may be electrically connected to one end side of the printed circuit board 130 through a FPC 160 and a main PCB assembly 150 that controls the operation of the TPH. The main PCB assembly 150 may include a CPU for controlling an operation of TPH and/or a printer, a sensor, a motor controller, and image controller for printing. However, it is not limited thereto.

Meanwhile, the ceramic substrate 120 and the printed circuit board 130 may be installed to be spaced apart from each other by a predetermined distance around the COF module 110. For example, the COF module is accommodated between the ceramic substrate 120 and the printed circuit board 130.

In addition, the COF module 110 may be installed in a space between the ceramic substrate 120 and the printed circuit board 130. However, it is not limited thereto.

In this case, the COF module 110 may be configured such that the lower side, for example, the upper surface of the COF module 110 in which the TPH driving IC 111 is installed, is disposed in the direction of the heat sink 140.

In other words, the COF module 110 is positioned between the bottom surface of the film 112 in which the TPH driving IC 111 forms a conductive pattern and the top surface of the heat sink 140, so that the COF module 110 can minimize a portion protruding upwardly from the top surface of the ceramic substrate 120, thereby minimizing influences caused by contact or jamming between the COF module 110 and the printing paper in a printing process.

The heat sink 140 is attached to the lower portions of the ceramic substrate 120 and the printed circuit board 130 to dissipate heat generated, for an example, during printing.

Second Embodiment

First, the same reference numerals are used for the same components, and repetitive descriptions of the same components are omitted.

Figure 5:
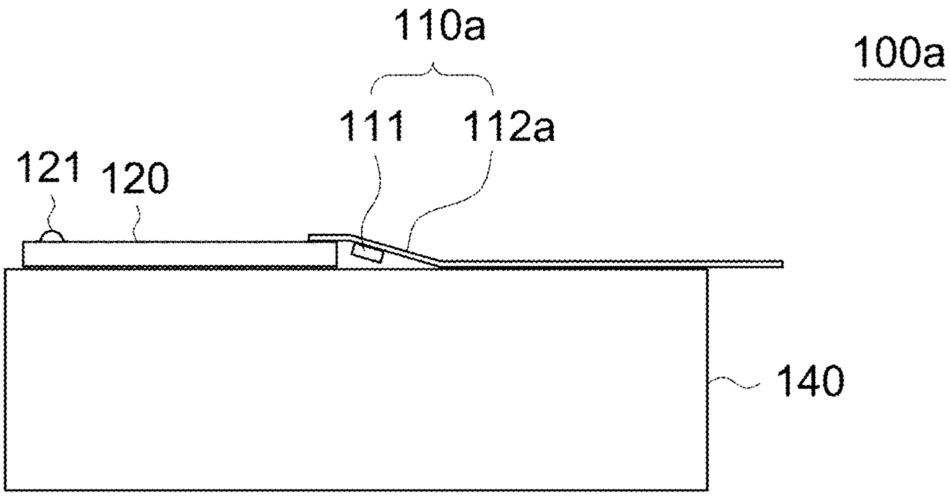
FIG. 5 is an exemplary diagram illustrating a thermal printhead having a COF structure according to a second embodiment of the present invention.
Figure 6:
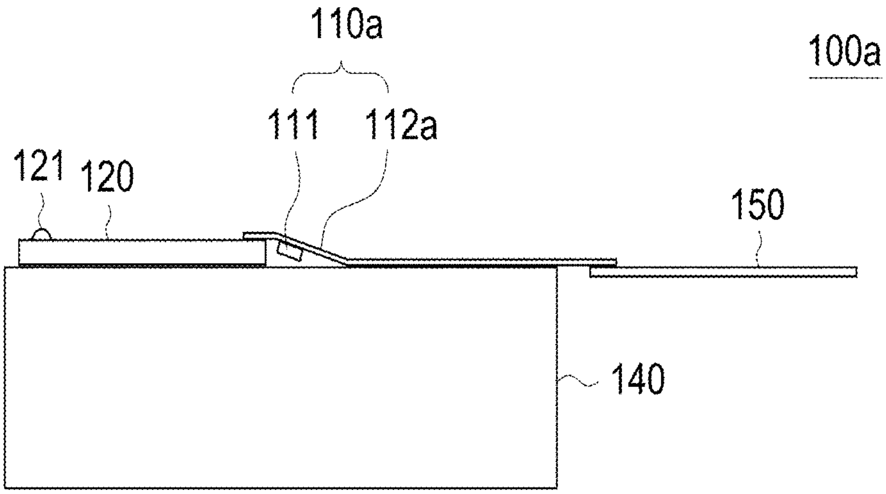
FIG. 6 illustrates a thermal print head having a COF structure and a main PCB assembly connected according to an embodiment of FIG. 5.

FIG. 5 is an exemplary diagram illustrating a thermal print head having a COF structure according to a second embodiment of the present invention, FIG. 6 is an illustrative diagram showing a TPH having a COF structure according to the embodiment of FIG. 5 and a main PCB assembly connected thereto.

Referring now to FIGS. 5 and 6, a TPH **100*a* having a COF structure according to a second embodiment of the present invention may include a COF module 110*a* having a film 112*a* on which a printed circuit is formed and a conductive pattern is formed such that a TPH driving IC 111 is electrically connected to one side thereof, and a heat sink 140 electrically connected to a lower side of the film 112*a*, a ceramic substrate 120 electrically connected to one side of the COF module 110*a*, and a heat sink 140 attached to the ceramic substrate 120 and the underside of the film 112*a*** to dissipate a heat.

The TPH **100*a* according to the second embodiment of the present invention differs from the configuration of the TPH 100 according to the first embodiment in the configuration of the COF module 110*a***.

The COF module **110*a* according to the second embodiment, a TPH driving IC 111 for driving the TPH 100*a* is formed on a film 112*a* having a conductive pattern, and the upper surface of the TPH driving IC 111 is configured to face the heat sink 140**.

The film **112*a* having a conductive pattern is formed in which a printed circuit for supplying electrical signals and power to the module 110*a* and the ceramic substrate 120 is formed, and the conductive pattern is formed such that the TPH driving IC 111 is electrically connected on one side, and a printed circuit may be installed on the other side of the film 112*a***.

The film **112*a*** may be a rectangular-shaped film, however, it is not limited thereto.

Further, the film **112*a* having a conductive pattern may be installed in close contact with the heat sink 140 on the other side of which the printed circuit is installed, and the end portion of film 112*a* may be extended a certain length beyond the heat sink 140, and a connection terminal (not shown) for connecting the TPH may be formed on the end portion of the film 112*a***.

In other words, the main PCB assembly 150, which controls the operation of the TPH, may be electrically connected to the end of the film **112*a***.

Further, the COF module **110*a* may include the TPH driving IC 111 formed electrode on the low side thereof and the film 112*a*** having a conductive pattern electrically connected thereto, and may be sealed using an insulating material, the insulating material may include silicon or epoxy.

Third Embodiment

First, the same reference numerals are used for the same components, and repetitive descriptions of the same components are omitted.

Figure 7:
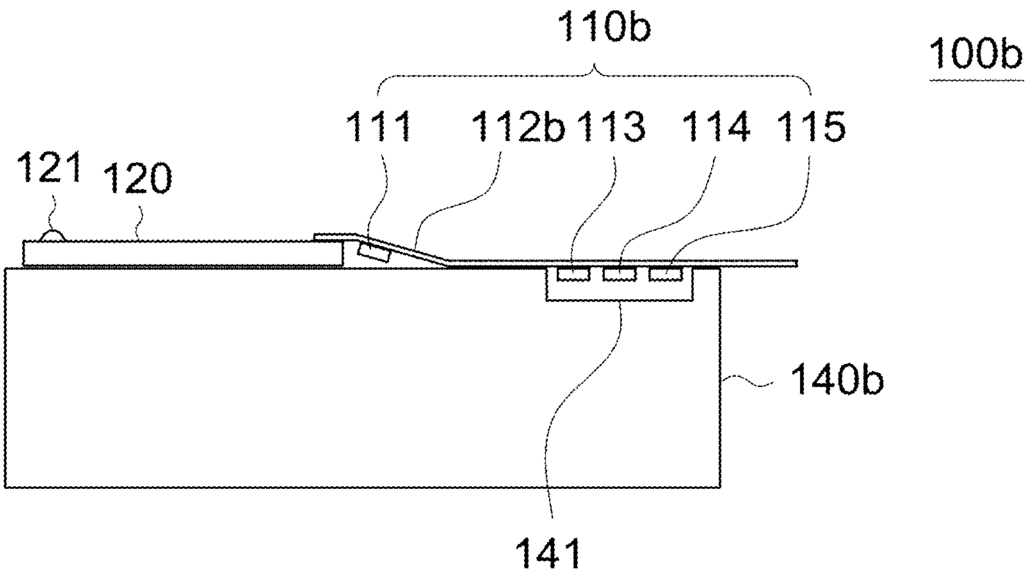
FIG. 7 illustrates a thermal printhead having a COF structure according to a third embodiment of the present invention.
Figure 8:
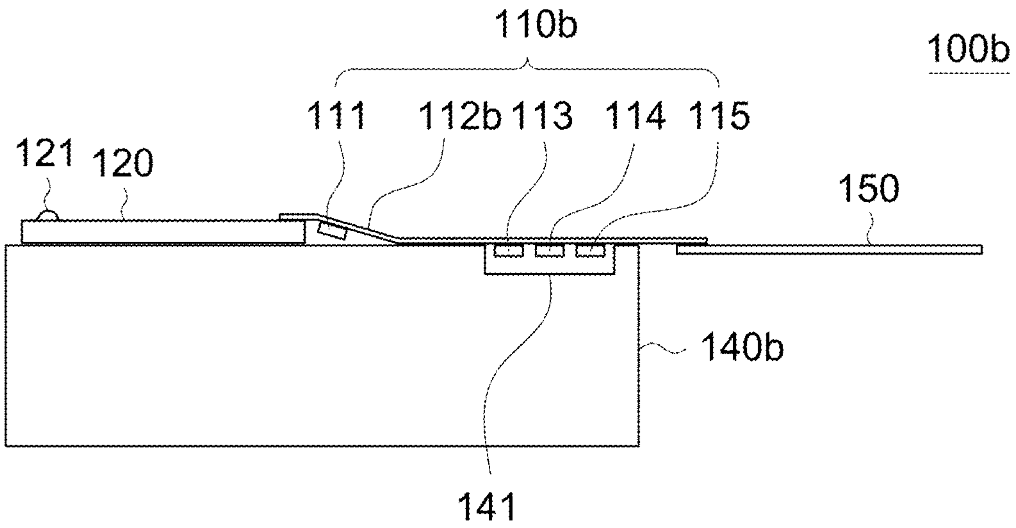
FIG. 8 illustrates a thermal print head having a COF structure and a main PCB assembly are connected according to an embodiment of FIG. 7.

FIG. 7 is an example showing a TPH with a COF structure according to the third embodiment of the present invention, and FIG. 8 is an example showing the state in which the TPH with a COF structure according to the embodiment of FIG. 7 and the main PCB assembly are connected.

Referring to FIGS. 7 and 8, the Thermal print head 100*b* according to the third embodiment is different from the configuration of the COF module 110*b* and the configuration of the heat sink 140*b* with the configuration of the thermal print head 100*a* according to the second embodiment.

The COF module 110*b* may include a TPH driving IC 111 for driving the thermal print head 100*b* is installed on a film 112*b* forming a conductive pattern, and the upper surface of the TPH driving IC 111 is configured to be disposed in the direction of the heat sink 140*b* according to the third embodiment of the present invention.

The rectangular film 112*b* having a conductive pattern is formed with a printed circuit for supplying electric signals and power to the COF module (110*b*) and the ceramic substrate (120). A conductive pattern may be formed to be electrically connected to one side surface of the TPH driving IC 111, and a printed circuit may be installed on the other side of the TPH driving IC 111. However, the conductive pattern and a printed circuit may be accommodated at a predetermined place where it necessary.

In addition, the rectangular film 112*b* having a conductive pattern is installed on the other side where the printed circuit is installed to be in close contact with the heat sink 140*b*, and the end portion of the rectangular film 112*b* can be installed to be extended by a predetermined length from the heat sink 140*b*.

In addition, at the end portion of the rectangular film 112*b* in which the conductive pattern is formed, a connection terminal (not shown) may be formed for connection with the TPH.

In other words, at the end portion of the rectangular film 112*b*, the main PCB assembly 150 that controls the operation of the TPH can be electrically connected.

In addition, the COF module 110*a* is electrically connected to an electrode formed on the bottom surface of the driving IC 111 and a rectangular film 112*b* having a conductive pattern, and can be sealed using an insulating material, wherein the insulating material may be made of silicon or epoxy.

In addition, the COF module 110*b* may be further configured to include a temperature sensing sensor 113 to detect the temperature of the heat sink 140*b*.

The temperature sensing sensor 113 may be configured in close contact with the heat sink 140*b*, and it senses the current temperature of the heat sink 140*b* and provides it as the temperature correction information of the TPH.

In addition, the temperature sensing sensor 113 may be installed in the same direction as the drive IC 111 on the rectangular film 112*b* in which the conductive pattern is formed, but not limited to, and may be installed in the opposite direction to the drive IC 111.

In addition, the COF module 110*b* may be configured to include one or more capacitors 114 that are charged with a predetermined power and supply a constant current when the drive IC 111 is operated.

In addition, one or more capacitors 114 may be installed in the same direction as the TPH driving IC 111 on the rectangular film 112*b* in which the conductive pattern is formed, but not limited to. The one or more capacitors 114 may be installed in an opposite direction to the drive IC 111.

In addition, the COF module 110*b* may be further configured to include an Energized Time Correction Control (ETCC) 115 for an operation control of the TPH.

In addition, the ETCC 115 may be installed in the same direction as the TPH driving IC 111 on the rectangular film 112*b* in which the conductive pattern is formed, but not limited to, and may be installed in the opposite direction to the TPH driving IC 111.

The heat sink 140*b* is attached to the ceramic substrate 120 and an oblong-shaped film 112*b* with a conductive pattern of the COF module 110*b* to allow heat generated during printing to be dissipated.

Further, the heat sink 140*b* forms a groove portion 141 on its upper surface, and allows at least any one of the temperature detection sensor 113, the capacitor 114, and the ETCC 115 to be accommodated.

In addition, the temperature sensor 113 housed in the groove portion 141 is configured in close contact with the heat sink 140*b*, so that the temperature of the heat sink 140*b* can be measured more accurately.

In other words, electronic components such as a temperature sensor 113, a capacitor 114 and an ETCC 115 are accommodated in the groove portion 141, so that electronic components such as the COF module 110*b* and the temperature sensor 113, capacitor 114 and the ETCC 115 can be minimized from contact with the printing paper or jamming occurs during the printing process.

Fourth Embodiment

First, the same reference numerals are used for the same components, and repetitive descriptions of the same components are omitted.

Figure 9:
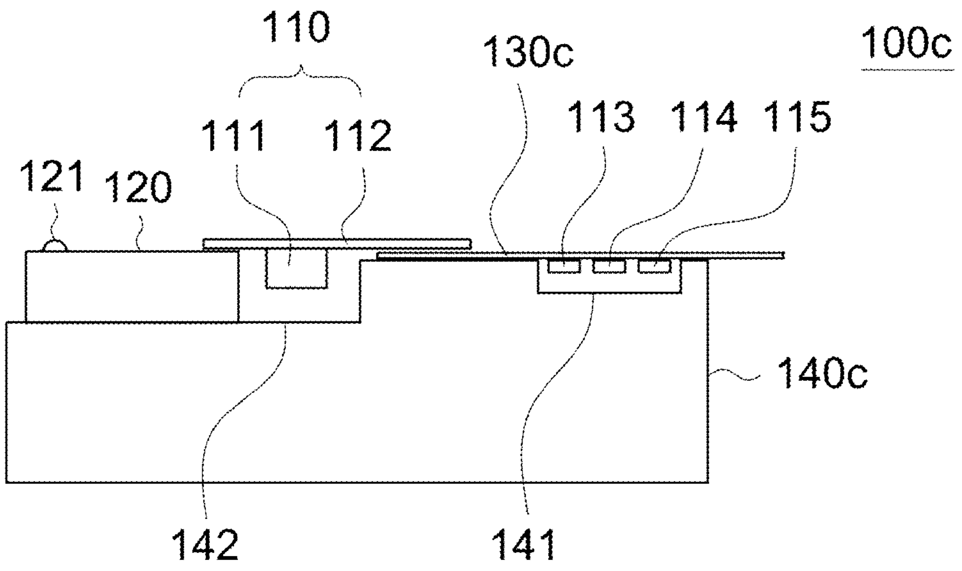
FIG. 9 illustrates a thermal printhead having a COF structure according to a fourth embodiment of the present invention.

FIG. 9 is an exemplary diagram illustrating a thermal print head having a COF structure according to a fourth embodiment of the present invention.

Referring to FIG. 9, the thermal print head 100*c* according to the fourth embodiment differs from the thermal print head 100 according to the first embodiment in the configuration of the printed circuit board 130*c* and the configuration of the heat sink 140*c*.

That is, the printed circuit board 130*c* according to the fourth embodiment may be configured to include a temperature detection sensor 113, a capacitor 114, and an ETCC 115.

The temperature sensing sensor 113 can be configured in close contact with the heat sink 140 *c*, and detects the current temperature of the heat sink 140 *c* and provides it as temperature correction information of the TPH.

In addition, the temperature sensing sensor 113 may be installed in the same direction as the drive IC 111 of the COF 110, but not limited to, it may be installed in the opposite direction to the TPH driving IC 111.

A capacitor 114 is a configuration in which a predetermined power is charged, and a predetermined current is supplied when the TPH driving IC 111 is operated, and one or more capacitors 114 may be installed.

In addition, one or more capacitors 114 may be installed in the same direction as the TPH driving IC 111 of the COF 110, but not limited to, in the opposite direction to the TPH driving IC 111.

An ETCC 115 is a configuration for the operation control of the TPH 100*d*, and may be installed in the same direction as the TPH driving IC 111 of the COF 110, but not limited to, may be installed in the opposite direction to the drive IC 111.

The heat sink 140 *c* may be installed on one side of the top surface of the groove portion 141 to house at least any one or more of the temperature sensors 113, the capacitor 114 and the ETCC 115 installed on the printed circuit board 130 *c*.

The groove portion 141 allows the temperature sensor 113, capacitor 114 and ETCC 115 of the printed circuit board 130 *c* to be stored inward of the heat sink 140 *c*, so that the printed circuit board 130*c* and electronic components protrude in the upward direction can be minimized, thereby minimizing the factors affecting the printing paper during the printing process.

In addition, the heat sink 140*c* may be formed on the other side of the top surface, for example, the step portion 142 of the 'L' shape or the groove of the 'U' shape may be formed in the cross section.

In other words, by settling the ceramic board 120 in the step part 142 to be accommodated, the ceramic board 120 is placed approximately flat with the COF module 110 and the printed circuit board 130*c*, so that the COF module 110, ceramic board 120 and printed circuit board 130*c* can minimize the part of the protrusion in the upward direction, thereby minimizing the factor affecting the printing paper in the printing process.

Fifth Embodiment

First, the same reference numerals are used for the same components, and repetitive descriptions of the same components are omitted.

Figure 10:
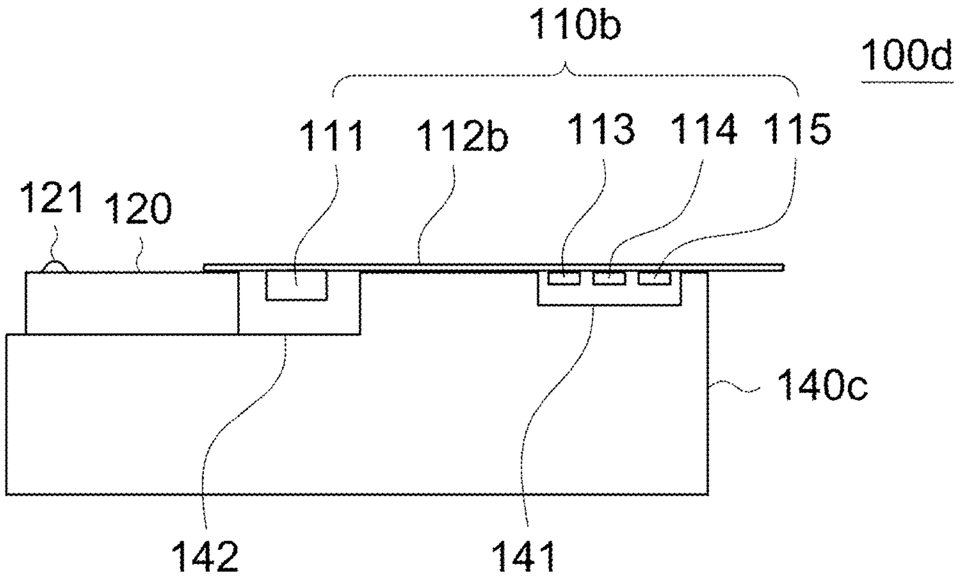
FIG. 10 illustrates a thermal printhead having a COF structure according to a fifth embodiment of the present invention.

FIG. 10 is an exemplary diagram illustrating a TPH having a COF structure according to a fifth embodiment of the present invention.

Referring to FIG. 10, the TPH 100*d* according to the fifth embodiment differs from the configuration of the TPH 100*c* according to the third embodiment in the configuration of the heat sink 140*c*.

That is, the TPH 100*d* according to the fifth embodiment may have a groove portion 141 that accommodates the temperature sensing sensor 113, the capacitor 114, and the ETCC 115 installed in the COF module 110*b* on one side of the upper surface of the heat sink 140*c*.

The groove portion 141 may allow the temperature sensor 113, the capacitor 114 and ETCC 115 of the COF module 110*b* to be housed inside the heat sink 140*c*, thereby minimizing upwardly protruding portions of the COF module 110*b* and various electronic components, thereby minimizing factors affecting printing paper during printing.

In addition, the heat sink 140*c* may have, for example, a step portion 142 having an 'L'-shaped cross-section or a 'U'-shaped groove formed on the other side of the upper surface.

Since the ceramic substrate 120 is seated on the step portion 142 to be accommodated, the ceramic substrate 120 is arranged to be approximately flat with the COF module 110*b*, thereby minimizing a portion where the COF module 110*b* and the ceramic substrate 120 protrude upward, thereby minimizing an element affecting printing paper in a printing process.

Therefore, the productivity can be improved with a lower step difference of the resin for the protection by using the COF mode.

In addition, the height of the thermo-compressed COF module can be minimized in comparison with the surface of the ceramic substrate by electrically connecting the ceramic substrate and the COF module through thermocompression bonding using ACF.

In addition, by minimizing the height of the heat-pressed COF module in relation to the surface of the ceramic substrate, the printing paper can pass through without jamming as it passes.

In addition, by minimizing the height of the heat-pressed COF module relative to the surface of the ceramic substrate, the print media can pass through without getting caught.

In addition, the TPH driving IC is configured to be positioned on the bottom surface of the COF module, thereby minimizing a protruding portion of the COF module upwardly than the ceramic substrate, thereby minimizing an element influencing the printing paper in a printing process.

Moreover, it can be electrically connected to the main printed circuit board assembly which controls the operation of the TPH without the separate connector by using the film, for example, an of the rectangular shape, in which the conductive pattern is formed. However, the film shape can be any type of shape.

Explanation of input raw materials will be following:

1. TPH Ceramic Substrate: A ceramic substrate on which the TPH's heating element and wiring are implemented, with a protective film process for insulation and abrasion resistance.
2. COF IC: An assembly consisting of a film for COF with TPH Driving IC and wiring implemented. (IC may be assembled in the center of the film. One or several ICs can be attached).
3. Heat Sink: A structure made of metal to effectively dissipate heat generated by a heating element. It can also act as a binder to assemble the substrate, COF, and PCB.
4. PCB: A substrate on which the wiring that delivers signals to the COF IC combined with the ceramic substrate is implemented. It is called FPCB when implemented on a film and HPCB when implemented on a regular PCB.

How to Make COF:

A) When Assembling on the Heat Sink

1. If a support is needed, apply a double-sided tape or adhesive on the heat sink, attach a ceramic substrate to a predetermined position thereon, and apply a uniform thickness of thermal grease for rapidly releasing heat to the part where the heating element is present.
2. Attach the PCB to the heat sink with double-sided tape or adhesive at the same location on the heat sink.
3. Apply the Anisotropic Conductive Film (ACF) to the ceramic substrate over the wiring to be connected.
4. Align the portion of the COF with the ceramic substrate and the wiring to be connected to the ceramic substrate at the location where it will be attached to the ceramic substrate, and apply heat and pressure using a tool shaped for the size of the attachment.
5. Attach the ACF to the PCB in the same manner as the ACF with the wiring connection PADs on the opposite side of the COF to the ceramic substrate, then apply heat and pressure.
6. May use lead and tin solder to attach the COF to the PCB without using ACF.
7. In paragraph 6, gold soldering with gold and zinc may be used instead of lead and tin.

B) When Assembling with Ceramic Substrates

1. Secure the ceramic board to the Outer Lead Bonding (OLB) assembly equipment.
2. Apply ACF (Anisotropic Conductive Film) to a certain part of the ceramic substrate above the wiring to be connected.

3. Align the portion of the COF with the ceramic substrate and wiring to be attached to the ceramic substrate at the location where it will be attached, and apply heat and pressure using a tool shaped for the size of the attachment.
4. Assemble the ceramic substrate with the COF attached to the support you want to support it.
5. Connect the opposite wiring connection terminals of the wiring from the COF to the ceramic substrate to the connector or connection PCB that will be connected to the system.
6. If necessary, the ceramic substrate to which the COF is connected can be attached to a certain portion of the heat sink or support using adhesive or double-sided tape. At this time, heat dissipation grease for heat dissipation can be applied between the ceramic substrate and the support in the area where the heating element is located.

As described above, a desirable embodiment of the present invention has been described with reference, but an ordinary skilled in the field of technology will be able to understand that the present invention can be modified and modified in various ways within the scope of the ideas and areas of the present invention described in the patent claims below.

In addition, the drawing numbers described in the patent claims of the present invention are only for the clarity and convenience of the explanation and are not limited to them, and in the process of describing the embodiment, the thickness of the lines shown in the drawing and the size of the components may be exaggerated for the sake of clarity and convenience of the description.

In addition, the aforementioned terms are defined in consideration of the functions of the present invention, which may vary depending on the intentions or practices of the user, operator, and so the interpretation of these terms should be based on the contents of the present specification as a whole.

In addition, even if it is not expressly shown or explained, it is obvious that a person with ordinary knowledge in the technical field to which the present invention belongs can make various forms of transformation from the description of the present invention to include the technical idea of the present invention, which still falls within the scope of the rights of the present invention.

While the invention has been particularly shown and described with reference to several embodiments thereof, it will be understood by those skilled in the art that the foregoing and other changes in form and details may be made therein without departing from the spirit and scope of the invention.

In addition, the above embodiments described with reference to the accompanying drawings are described for the purpose of illustrating the present invention, and the scope of rights of the present invention is not limited to such embodiments.

EXPLANATION OF NUMERAL REFERENCES

100, 100*a*, 100*b*, 100*c*, 100*d*: TPH
110, 110*a*, 110*b*: COF module
111: TPH driving IC
112, 112*a*, 112*b*: Film with a conductive pattern formed
113: Temperature Detection Sensor
114: Capacitors
115: ETCC(Energized Time Correction Control)
120: ceramic subtract
121: Heat Resistor
130, 130*c*: Printed Circuit Board
140, 140*b*140*b*, 140*c*: heat sink
141: groove portion
150: main PCB assembly
160: FPC

What is claimed is:

1. A thermal print head (TPH) with a COF structure, the TPH comprising:
a TPH driving IC;
a chip on film (COF) module including a film on which a conductive pattern is formed electrically connected to the TPH driving IC;
a ceramic substrate electrically connected to the COF module;
a heating resistor array having a plurality of heating elements formed on the ceramic substrate;
a heat sink attached to a lower portion of the ceramic substrate to radiate heat, and
a printed circuit board formed on an upper surface of the heat sink and electrically connected to the other side of the COF module,
wherein the COF module is accommodated on or over an upper surface of the heat sink,
wherein the ceramic substrate receives electric signals and a power from the COF module,
wherein the ceramic substrate and the COF module are bonded using Anisotropic Conductive Film (ACF).

2. The TPH with the COF structure of claim 1, further comprising a printed circuit board.

3. The TPH with the COF structure of claim 2, wherein the COF module is accommodated in between the ceramic substrate and the printed circuit board.

4. The TPH with the COF structure of claim 2, wherein the PCB comprises at least any one or more of a temperature sensor for detecting temperature of the heat sink, a capacitor for suppling a predetermined current to the TPH driving IC, and an Energized Time Correction Control (ETCC) for controlling an operation of the TPH thereon.

5. The TPH with the COF structure of claim 1, wherein the heat sink has a groove portion to accommodate at least any one of a temperature sensor for detecting temperature of the heat sink, a capacitor for suppling a predetermined current to the TPH driving IC, and an Energized Time Correction Control (ETCC).

6. The TPH with the COF structure of claim 4, wherein the heat sink has a step portion formed to accommodate the ceramic substrate so that the ceramic substrate is disposed flat with the COF module and the printed circuit board.

7. The TPH with COF structure of claim 1, further includes a Flexible Printer Circuit (FPC) attached to one end of the printed circuit board and wherein the FPC electrically connects the main PCB assembly, which controls an operation of the TPH.

8. The TPH with the COF structure of claim 1,
wherein an upper surface of the TPH driving IC faces to the heat sink.

* * * * *